June 8, 1948.     J. D. CHESSROWN     2,442,971
SLOW DOWN SIGNAL FOR AUTOMOBILES
Filed July 16, 1947
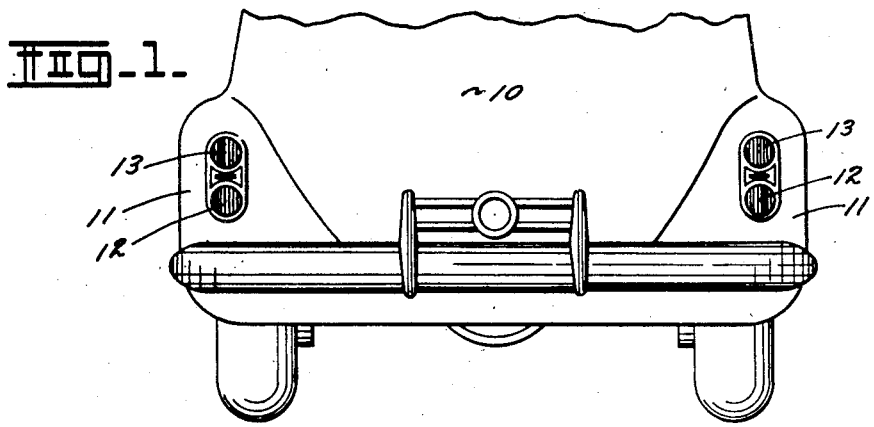
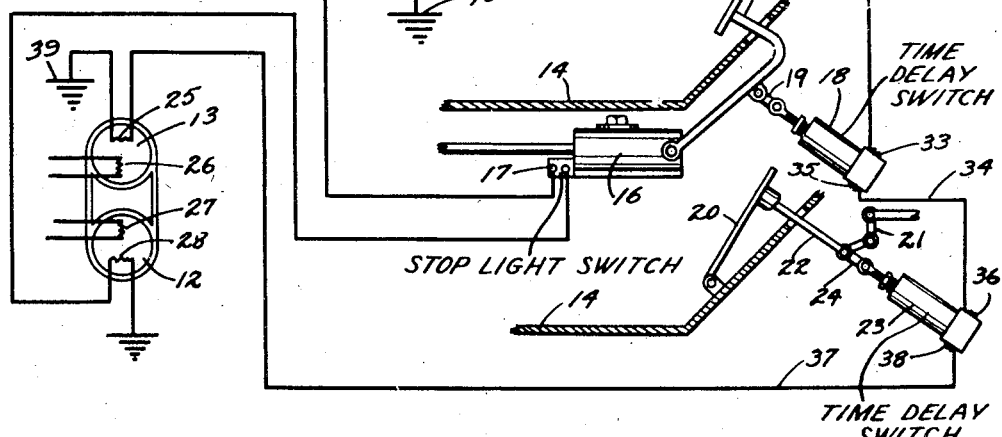
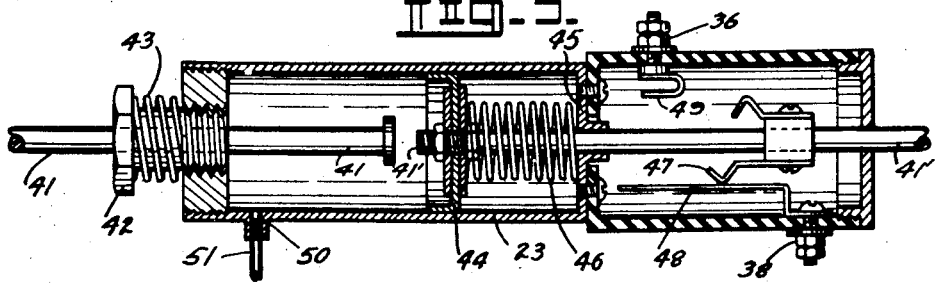
INVENTOR.
James D. Chessrown.
BY
ATTORNEY.

Patented June 8, 1948

2,442,971

UNITED STATES PATENT OFFICE 2,442,971

SLOW DOWN SIGNAL FOR AUTOMOBILES

James D. Chessrown, Youngstown, Ohio

Application July 16, 1947, Serial No. 761,357

5 Claims. (Cl. 177—329)

This invention relates to a signal for automobiles and more particularly to a caution signal adapted for automatic actuation at such time as an automobile on which it is applied slows down as preparatory to stopping or the like.

The principal object of the invention is the provision of a signal device for automobiles which will indicate a definite slowing down of the automobile and incorporating means bridging intermittent movement of the controls of the automobile to the end that false signals are avoided.

A further object of the invention is the provision of a signal device for an automobile incorporating a delayed action mechanism insuring accurateness of the signaling system in operation.

A still further object of the invention is the provision of a signaling device for automobiles incorporating adjustable means for varying the delayed timing action of the device.

The signal for automobiles disclosed herein comprises a system of interconnected devices operative with the controls of the automobile for visually indicating a slowing down of the automobile by illuminating caution lights. The signaling devices are so arranged and interconnected that upon the brakes of the automobile being applied, the visual caution signal is extinguished so as not to conflict with the illumination of the customary stop light signal.

The interconnected devices of the signal for automobiles provide for illuminating caution lights such as may be combined with the direction indicating signals of the automobile only at such times as a definite slowing down action of the automobile takes place as occasioned, for example, by the releasing of the accelerator pedal for one or more seconds. Such action eliminates the illumination of the caution signals which would otherwise occur when the accelerator pedal is momentarily released such as occurs when the automobile is being operated in traffic and continuous intermittent accelerator action is necessary.

The signal for automobiles is of simple formation capable of economic manufacture and is inoperative most of the time on the automobile, thereby avoiding excessive battery drain. A motorist following an automobile equipped with the signal disclosed herein observes no signals until such time as the accelerator pedal in the equipped automobile is released and a predetermined delayed action time elapses; for example, a second or two, at which time caution lights, preferably yellow, are illuminated indicating that the automobile is slowing down. If the accelerator in the equipped automobile is again depressed and the slowing down cycle terminated, the caution lights are immediately extinguished. However, if the brake pedal is depressed in applying the brakes of the equipped automobile, the caution lights are extinguished and the red stop lights are illuminated. Thus, a motorist following an automobile equipped with the signal disclosed herein is visually advised of the slowing down of the equipped automobile sufficiently in advance to avoid the danger of collision.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a rear view of a portion of an automobile equipped with the caution signal.

Figure 2 is a diagrammatic view of the caution signal apparatus and the operating means for the same.

Figure 3 is an enlarged cross section of a portion of the apparatus illustrated in Figure 2.

By referring to the drawings and Figure 1 in particular it will be seen that a portion of an automobile 10 is disclosed and that upon each of the rear fenders 11 thereof there is a combination taillight and stop light 12 and a combination caution and direction indicating light 13. The taillight and stop light combination 12 are provided with red lenses and the caution and direction indicating combinations 13 are preferably provided with yellow lenses.

By referring to Figure 2 of the drawings it will be seen that a portion of the floor board of the automobile is disclosed and indicated by the numeral 14, and a brake pedal 15 is operatively positioned therethrough and connected therewith so as to pivot upon a hydraulic brake actuating cylinder 16. A hydraulic stop light electric switch 17 is operatively connected to the hydraulic brake cylinder 16 and a delayed action air cylinder switch 18 is connected by means of a link 19 with the brake pedal 15. An accelerator pedal 20 is also positioned on the floor board 14 and is operatively connected to the carburetor (not shown) of the automobile as by means of an L-shaped, pivoted bracket 21 and connecting rods 22. A secondary delayed action air cylinder switch 23 (similar to switch 18) is connected with one of the connecting rods 22 by means of a link 24. In Figure 2 of the drawings the caution and direction indicating lamp 13 is shown provided with a pair of filaments 25 and 26, respectively, and the stop light and taillight combination 12 is shown with a pair of filaments 27 and 28, respectively.

An ignition switch is illustrated in Figure 2 and indicated by the numeral 29. A battery is diagrammatically illustrated and indicated by the numeral 30. A circuit wire 31 connects the battery 30 with the ignition switch 29 and a circuit wire 32 connects the ignition switch 29 with a terminal 33 on the air cylinder switch 18. A circuit wire 34 connects a terminal 35 on the air cylinder switch 18 with a terminal 36 on the secondary air cylinder switch 23. A circuit wire 37 connects a terminal 38 on the secondary air cylinder switch 23 with the filament 25 which is also grounded, as indicated by the numeral 39.

As the battery 30 is grounded (as indicated by the numeral 40), an electrical circuit is connected from the battery 30 through the filament 25 of the caution signal at such times as the ignition switch 29 is closed and the brake pedal 15 and the accelerator pedal 20 are in released position. If desired, an additional control switch (not shown) may be connected in the circuit comprising the wires 32, 34 and 37 and operated by the clutch or automatic transmission mechanism of an automobile so that the said circuit is broken when the clutch of the automobile equipped is not engaged or the automatic transmission of the automobile is in neutral.

As disclosed in Figure 2 of the drawings, the depressing of the accelerator pedal 20 will open the secondary air cylinder switch 23 and the signal circuit will thereby remain open until such time as the accelerator pedal is released and for a predetermined time thereafter due to the action of the secondary air cylinder switch 23 in delaying the closing of the signal circuit therethrough. At such time as the equipped automobile is slowing down and the accelerator pedal 20 released for a time longer than a second or two, depending on the setting of the secondary air cylinder switch 23, the delayed action closing of the secondary air cylinder switch 22 will illuminate the caution light 13 by energizing the filament 25 therein. As the automobile continues to slow down and the brake pedal 15 is depressed as in applying the brakes to stop, the air cylinder switch 18 operates to break the caution signal circuit and extinguish the caution light 13 and simultaneously the stop light switch 17 will be closed by the action in the hydraulic cylinder 16 as occasioned by depressing the brake pedal 15, and the filament 28 in the combination taillight and stop light 12 will be energized and the stop light illuminated.

When the automobile is standing and the brake pedal 15 depressed, the caution lights 13 will remain extinguished and the stop lights 12 will remain illuminated. When the brake pedal 15 is released, the air cylinder switch 18 will delay the closing of the caution light circuit sufficiently to permit the accelerator pedal 20 to be depressed as in starting the automobile, which action will cause the secondary air cylinder switch 23 to open the caution signal circuit to the end that the catuion signal 13 will not be illuminated during the accelerating action of the automobile nor during the subsequent normal operation thereof as any momentary releasing of the accelerator pedal 20 will be compensated for by the delayed action of the secondary air cylinder switch 23 and the signal circuit will remain open, as heretofore described.

By referring now to Figure 3 of the drawings a detailed cross section of the air cylinder switch 23 may be seen and it will be observed that it comprises generally a cylindrical body member having an actuating piston rod 41 slidably engaging a combination adjusting valve and gland 42 which is normally held in preset position by a spring 43. A piston 44 is positioned within the cylindrical body 23 of the secondary air cylinder switch 23 and a secondary portion 41' of the piston rod is affixed to the piston 44 and continues therethrough and through an opening defined by an annular shoulder 45 in the cylindrical body member. A coil spring 46 is positioned between the annular shoulder 45 and the piston 44 and normally urges the piston 44 toward the adjustment valve and gland 42.

The end of the secondary piston rod 41' (which projects through the opening formed by the annular shoulder 45) carries a contact member 47 which is connected by a flexible wire 48 with the terminal 38 heretofore referred to. The terminal 36, heretofore referred to, extends into position adjacent the contact 47 and is provided with a secondary contact 49. It will thus be seen that the coil spring 46 normally urges the piston 44 toward the adjusting valve and gland 42 and thereby brings the contact 47 and secondary contact 49 into registry with one another and closes an electrical circuit through the terminals 36 and 38 as heretofore referred to in connection with the description of Figure 2.

It will be obvious to those skilled in the art that by varying the position of the contacts 47 and 49 the operation of the secondary air cylinder switch may be reversed so that it may be connected in a different manner to the accelerator pedal 20 and the rod 41 moved inwardly of the device to close the circuit rather than outwardly thereof.

By referring again to Figure 3 of the drawings it will be seen that a port 50 communicates with the cylindrical body member 23 and more particularly with the compressed air chamber portion thereof and is preferably extended to a remote location such as, for example, on the dashboard of the equipped automobile. A simple air valve (not shown) is applied to the end of a tubular extension 51 in communication with the port 50 so as to form a readily adjustable means for varying the delayed timing action of the air cylinder switch. The remote positioning of the alternate adjustment means of the air cylinder switch enables the operator of the equipped automobile to vary the delayed timing action so as to correspond with his particular driving habits.

It will thus be seen that a simple delayed action air cylinder switch makes possible a practical and efficient caution signal for an automobile as its operation in the caution signal device eliminates false signals which would otherwise occur during the normal operation of the equipped automobile and provides positive operation of the caution signals at such time as the automobile is definitely slowing down. It will also be obvious that motorists accustomed to yellow caution signals and red stop lights as used in traffic signals will readily recognize and interpret the combined and interdependent caution signal and stop light action made possible by the invention herein disclosed.

Having thus described my invention, what I claim is:

1. A caution signal for automobiles comprising an electric light, a current source, a circuit in connection with the said light and said current source, a pair of switches in said circuit, one of the said switches operatively connected to the brake pedal of the said automobile and the other one of the said switches operatively connected to the accelerator pedal of the automobile, and means for delaying the closing of the said switches.

2. A caution signal for automobiles comprising an electric light, a current source, a circuit in connection with the said light and said current source, a pair of switches in said circuit, one of the said switches operatively connected to the brake pedal of the said automobile and the other one of the said switches operatively connected to the accelerator pedal of the automobile, and means for delaying the closing of the said switches, said means comprising air cylinder and piston assemblies.

3. A caution signal for automobiles comprising an electric light, a current source, a circuit in connection with the said light and said current source, a pair of switches in said circuit, one of the said switches operatively connected to the brake pedal of the said automobile and the other one of the said switches operatively connected to the accelerator pedal of the automobile, and means for delaying the closing of the said switches, said means comprising adjustable air cylinder and piston assemblies.

4. A caution signal for automobiles comprising an electric light, a current source, a circuit in connection with the said light and said current source, a pair of switches in said circuit, spring means normally urging each of the pair of switches toward closed position, one of the said switches operatively connected to the brake pedal of the said automobile and the other one of the said switches operatively connected to the accelerator pedal of the automobile, and pneumatic means for delaying the closing of the said switches.

5. A caution signal for automobiles comprising an electric light, a current source, a circuit in connection with the said light and said current source, a pair of switches in said circuit, spring means normally urging each of the pair of switches toward closed position, one of the said switches operatively connected to the brake pedal of the said automobile and the other one of the said switches operatively connected to the accelerator pedal of the automobile, and adjustable pneumatic means for delaying the closing of the said switches, said adjustable pneumatic means comprising an air cylinder and piston assembly.

JAMES D. CHESSROWN.

REFERENCES CITED

The following references are of record in the file of this patent:

UNITED STATES PATENTS

| Number | Name | Date |
| --- | --- | --- |
| 1,956,056 | Bellec et al. | Apr. 24, 1934 |
| 2,096,069 | Seiden | Oct. 19, 1937 |
| 2,128,769 | Finnell | Aug. 30, 1938 |
| 2,260,680 | Nelsen | Oct. 28, 1941 |